United States Patent
Pereira

(10) Patent No.: US 9,332,030 B1
(45) Date of Patent: May 3, 2016

(54) SYSTEMS AND METHODS FOR THWARTING ILLEGITIMATE INITIALIZATION ATTEMPTS

(71) Applicant: Symantec Corporation, Mountain View, CA (US)

(72) Inventor: Shane Pereira, Newbury Park, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 14/485,287

(22) Filed: Sep. 12, 2014

(51) Int. Cl.
  *G06F 7/04* (2006.01)
  *H04L 29/06* (2006.01)
  *G06F 21/62* (2013.01)

(52) U.S. Cl.
  CPC ............ *H04L 63/1458* (2013.01); *G06F 21/62* (2013.01); *H04L 63/10* (2013.01)

(58) Field of Classification Search
  CPC ...... H04L 63/1458; H04L 63/10; G06F 21/62
  USPC .......................................................... 726/27
  See application file for complete search history.

(56) References Cited

U.S. PATENT DOCUMENTS

| 7,523,374 | B1* | 4/2009 | Lee ..................... | H03M 13/333 370/335 |
| 2008/0134327 | A1* | 6/2008 | Bharrat ............... | H04L 63/1458 726/22 |
| 2011/0320617 | A1* | 12/2011 | Annamalaisami .. | H04L 63/1458 709/228 |

OTHER PUBLICATIONS

Haas, Juergen "SYN flood", http://linux.about.com/cs/linux101/g/synflood.htm, as accessed Jul. 10, 2014, About.com, (Oct. 28, 2006).
"Transmission Control Protocol", http://en.wikipedia.org/wiki/Transmission_Control_Protocol, as accessed Jul. 10, 2014, Wikipedia, (Dec. 18, 2003).

* cited by examiner

Primary Examiner — Mohammad W Reza
(74) Attorney, Agent, or Firm — ALG Intellectual Property, LLC

(57) ABSTRACT

The disclosed computer-implemented method for thwarting illegitimate initialization attempts may include (1) receiving an initialization packet designed to initiate communication between a source port on a source computing device and a destination port on a destination computing device, (2) thwarting potential illegitimate initialization attempts by intentionally dropping the initialization packet, (3) receiving an additional initialization packet, (4) determining that the additional initialization packet is from the same source port on the same source computing device and is directed to the same destination port on the same destination computing device as the original initialization packet, and (5) sending an acknowledgement packet that initiates communication between the source computing device and the destination computing device. Various other methods, systems, and computer-readable media are also disclosed.

20 Claims, 7 Drawing Sheets

SYSTEMS AND METHODS FOR THWARTING ILLEGITIMATE INITIALIZATION ATTEMPTS

BACKGROUND

Any computing system that is connected to a network faces threats from other computing systems connected to that network. When the network in question is the Internet, the number of potential threats is quite large. Many malicious computing systems begin attacks by conducting a port scan of potential victim devices. Port scans often involve sending packets to each port on a host, in turn, and monitoring the responses (or lack thereof). The results of a port scan may allow attackers to identify what operating systems and/or services are running on a host device based on which ports are open. Attackers may then use this information to launch targeted attacks against services on the host with known vulnerabilities.

Many traditional systems for blocking port scans rely on detecting a pattern of activity that is indicative of a port scan, such as repeated packets sent to different ports from the same remote device. However, some attackers have compensated for this by drastically slowing the speed of their port scans so that the packets appear to be unrelated. Unfortunately, attempts to prevent such port scans run the risk of breaking network functionality for benign systems that are making genuine initialization attempts. Accordingly, the instant disclosure identifies and addresses a need for additional and improved systems and methods for thwarting port scans and other illegitimate initialization attempts without compromising the functionality of benign systems.

SUMMARY

As will be described in greater detail below, the instant disclosure describes various systems and methods for thwarting port scans and other illegitimate initialization attempts by dropping the first initialization packet in any connection attempt and only responding to subsequent packets.

In one example, a computer-implemented method for thwarting illegitimate initialization attempts may include (1) receiving an initialization packet designed to initiate communication between a source port on a source computing device and a destination port on a destination computing device, (2) thwarting potential illegitimate initialization attempts by intentionally dropping the initialization packet, (3) receiving an additional initialization packet, (4) determining that the additional initialization packet is from the same source port on the same source computing device and is directed to the same destination port on the same destination computing device as the original initialization packet, and (5) sending an acknowledgement packet that initiates communication between the source computing device and the destination computing device in response to determining that the additional initialization packet is from the same source port on the same source computing device and is directed to the same destination port on the same destination computing device as the original initialization packet.

In some examples, determining that the additional initialization packet is from the same source port on the same source computing device and is directed to the same destination port on the same destination computing device may include determining that the additional initialization packet was received within a predetermined time period after receiving the original initialization packet. In one embodiment, the initialization packet may include a transmission control protocol (TCP) synchronize packet.

A variety of things may cause the connection to end and the process to restart with a new connection. In such cases, the computer-implemented method may further include (1) receiving a connection reset packet from the source port on the source computing device directed to the destination port on the destination computing device, (2) receiving a new initialization packet from the source port on the source computing device directed to the destination port on the destination computing device, and (3) thwarting potential illegitimate initialization attempts by intentionally dropping the new initialization packet.

In another example, the computer-implemented method may further include (1) receiving a connection termination packet from the source port on the source computing device directed to the destination port on the destination computing device, (2) receiving a new initialization packet from the source port on the source computing device directed to the destination port on the destination computing device, and (3) thwarting potential illegitimate initialization attempts by intentionally dropping the new initialization packet. Additionally or alternatively, the computer-implemented method may further include (1) terminating communication between the source computing device and the destination computing device after a predetermined time period has passed without receiving any packets from the source computing device, (2) receiving a new initialization packet from the source port on the source computing device directed to the destination port on the destination computing device, and (3) thwarting potential illegitimate initialization attempts by intentionally dropping the new initialization packet.

The first initialization packet from any port may be dropped even if a connection already exists with another port on the same source computing device. For example, the computer-implemented method may further include receiving a new initialization packet designed to initiate communication between an additional source port on the source computing device and the destination port on the destination computing device and thwarting potential illegitimate initialization attempts by intentionally dropping the new initialization packet.

In one embodiment, a system for implementing the above-described method may include (1) a receiving module, stored in memory, that (a) receives an initialization packet designed to initiate communication between a source port on a source computing device and a destination port on a destination computing device and (b) receives an additional initialization packet, (2) a thwarting module, stored in memory, that thwarts potential illegitimate initialization attempts by intentionally dropping the initialization packet, (3) a determination module, stored in memory, that determines that the additional initialization packet is from the same source port on the same source computing device and is directed to the same destination port on the same destination computing device as the original initialization packet, (4) a sending module, stored in memory, that sends an acknowledgement packet that initiates communication between the source computing device and the destination computing device in response to determining that the additional initialization packet is from the same source port on the same source computing device and is directed to the same destination port on the same destination computing device as the original initialization packet, and (5) at least one physical processor configured to execute the receiving module, the thwarting module, the determination module, and the sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive an initialization packet designed to initiate communication between a source port on a source computing device and a destination port on a destination computing device, (2) thwart potential illegitimate initialization attempts by intentionally dropping the initialization packet, (3) receive an additional initialization packet, (4) determine that the additional initialization packet is from the same source port on the same source computing device and is directed to the same destination port on the same destination computing device as the original initialization packet, and (5) send an acknowledgement packet that initiates communication between the source computing device and the destination computing device in response to determining that the additional initialization packet is from the same source port on the same source computing device and is directed to the same destination port on the same destination computing device as the original initialization packet.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
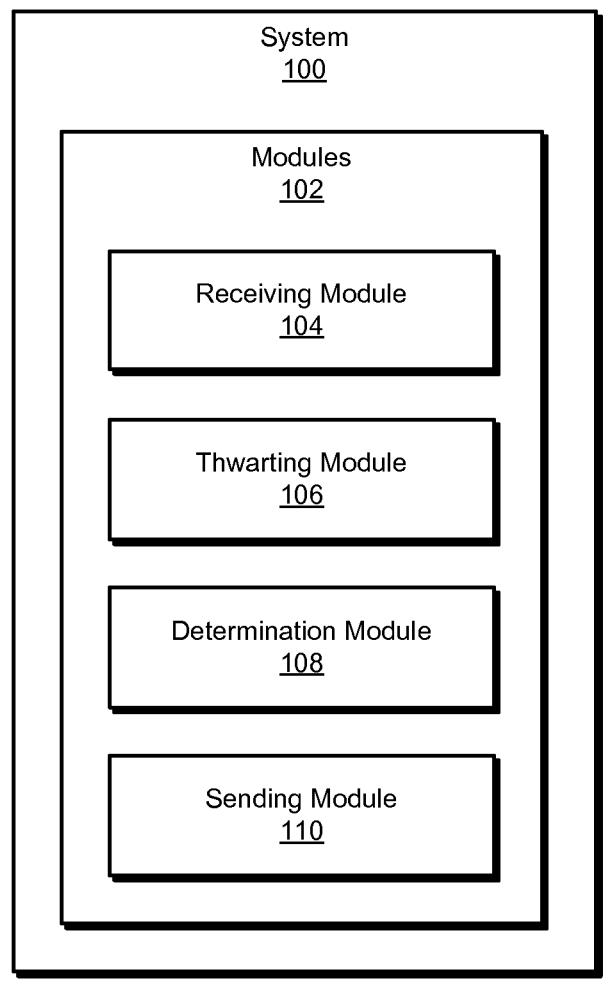
FIG. 1 is a block diagram of an exemplary system for thwarting illegitimate initialization attempts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for thwarting port scans and other illegitimate initialization attempts. As will be explained in greater detail below, by failing to respond to the first initialization packet of any connection attempt, the systems described herein may thwart illegitimate initialization attempts without having to classify any packet as legitimate or illegitimate since legitimate initialization attempts often send additional initialization packets until a response is received while illegitimate initialization attempts often do not.

Figure 2:
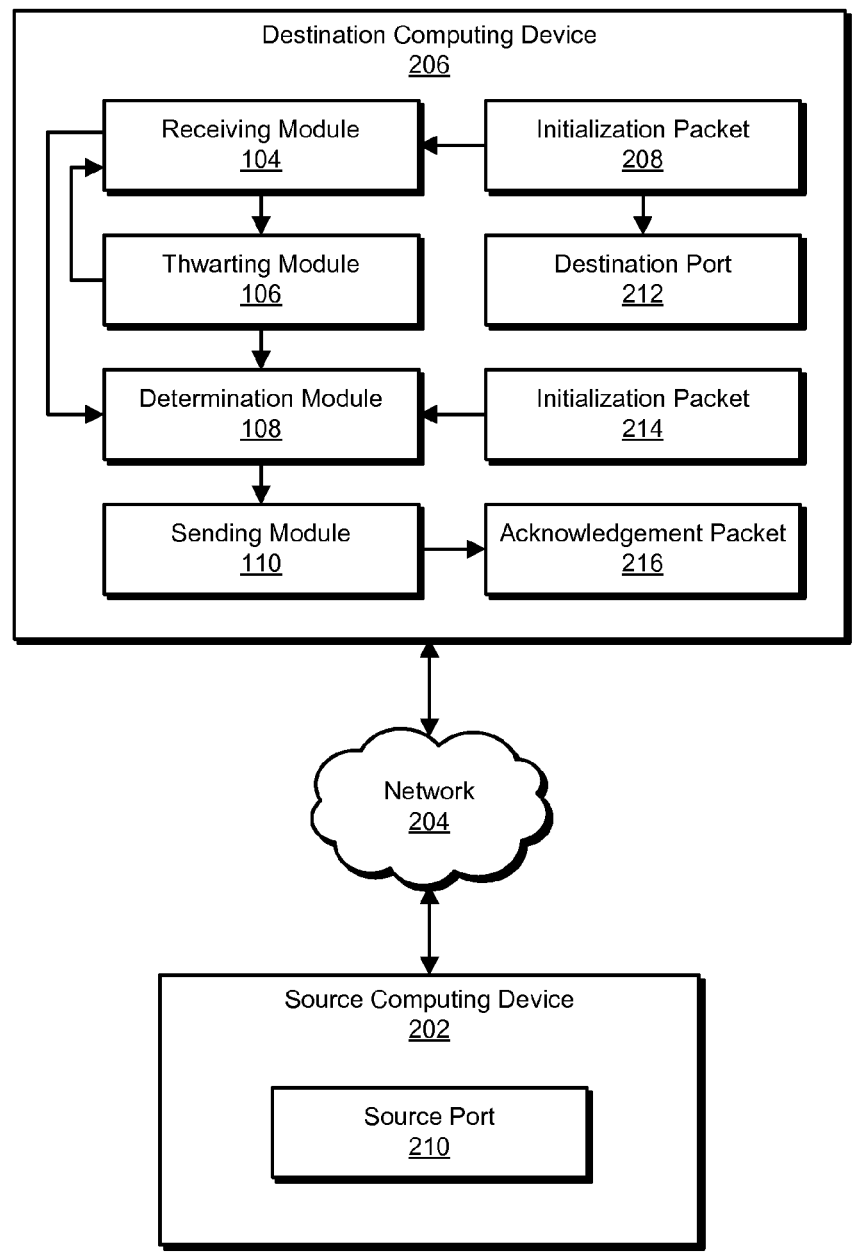
FIG. 2 is a block diagram of an additional exemplary system for thwarting illegitimate initialization attempts.

The following will provide, with reference to FIGS. 1-2, detailed descriptions of exemplary systems for thwarting illegitimate initialization attempts. Detailed descriptions of corresponding computer-implemented methods will also be provided in connection with FIG. 3. Detailed descriptions of illegitimate and legitimate initialization attempts will be provided in connection with FIGS. 4 and 5 respectively. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for thwarting illegitimate initialization attempts. As illustrated in this figure, exemplary system 100 may include one or more modules 102 for performing one or more tasks. For example, and as will be explained in greater detail below, exemplary system 100 may include a receiving module 104 that may receive an initialization packet designed to initiate communication between a source port on a source computing device and a destination port on a destination computing device. Exemplary system 100 may additionally include a thwarting module 106 that may thwart potential illegitimate initialization attempts by intentionally dropping the initialization packet.

Receiving module 104 may also receive an additional initialization packet. In addition, exemplary system 100 may also include a determination module 108 that may determine that the additional initialization packet is from the same source port on the same source computing device and is directed to the same destination port on the same destination computing device as the original initialization packet. Exemplary system 100 may additionally include a sending module 110 that may send an acknowledgement packet that initiates communication between the source computing device and the destination computing device in response to determining that the additional initialization packet is from the same source port on the same source computing device and is directed to the same destination port on the same destination computing device as the original initialization packet. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., source computing device 202 and/or destination computing device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a source computing device 202 in communication with a destination computing device 206 via a network 204. In one example, destination computing device 206 may be programmed with one or more of modules 102.

In one embodiment, one or more of modules 102 from FIG. 1 may, when executed by at least one processor of destination computing device 206, enable destination computing device 206 to thwart illegitimate initialization attempts. For example, and as will be described in greater detail below, receiving module 104 may receive an initialization packet 208 designed to initiate communication between a source port 210 on a source computing device 202 and a destination port 212 on destination computing device 206. Next, thwarting module 106 may thwart potential illegitimate initialization attempts by intentionally dropping initialization packet 208. At some later time, receiving module 104 may receive an additional initialization packet 214. Then, determination module 108 may determine that additional initialization packet 214 is from the same source port 210 on the same source computing device 202 and is directed to the same destination port 212 on the same destination computing device 206 as the original initialization packet 208. Finally, sending module 110 may send an acknowledgement packet 216 that initiates communication between the source computing device 202 and the destination computing device 206 in response to determining that additional initialization packet 214 is from the same source port 210 on the same source computing device 202 and is directed to the same destination port 212 on the same destination computing device 206 as the original initialization packet 208.

Source computing device 202 and destination computing device 206 generally represent any type or form of computing device capable of reading computer-executable instructions and/or communicating via packets. Examples of source computing device 202 and destination computing device 206 include, without limitation, laptops, tablets, desktops, servers (including application servers and database servers configured to provide various database services and/or run certain software applications), cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between source computing device 202 and destination computing device 206.

Figure 3:
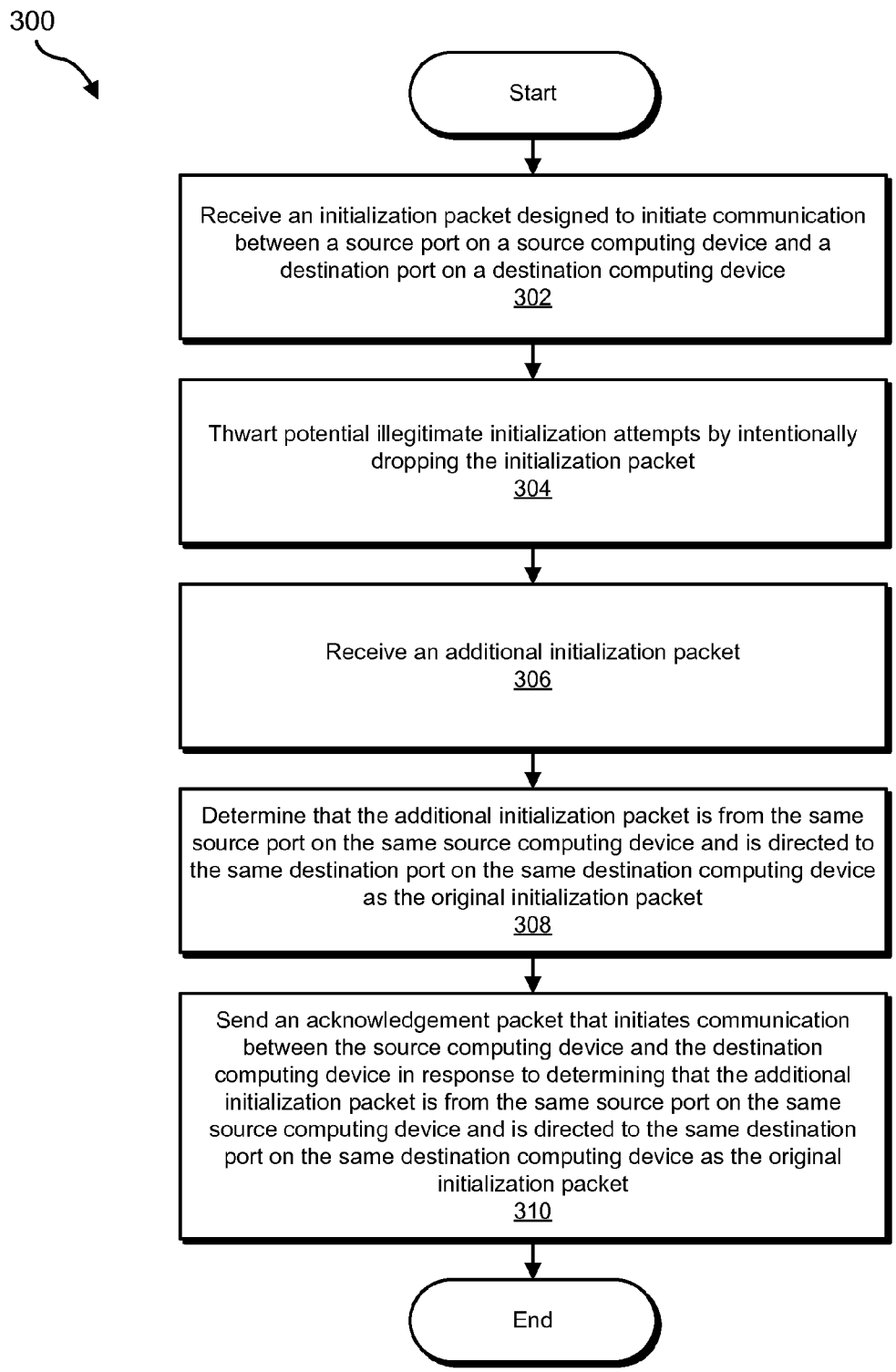
FIG. 3 is a flow diagram of an exemplary method for thwarting illegitimate initialization attempts.

FIG. 3 is a flow diagram of an exemplary computer-implemented method 300 for thwarting illegitimate initialization attempts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive an initialization packet designed to initiate communication between a source port on a source computing device and a destination port on a destination computing device. For example, receiving module 104 may, as part of destination computing device 206 in FIG. 2, receive an initialization packet 208 designed to initiate communication between a source port 210 on a source computing device 202 and a destination port 212 on destination computing device 206.

The term "initialization packet," as used herein, generally refers to any packet sent from one computing device to another computing device in order to initiate a connection between the two computing devices. In one example, the initialization packet may include a TCP synchronize (SYN) packet.

Receiving module 104 may receive an initialization packet in a variety of contexts. For example, receiving module 104 may be part of a server that receives packets sent by other computing devices on a network. In other examples, receiving module 104 may be part of a network security application, such as a firewall, that may determine whether or not to forward a packet to a server.

In some embodiments, receiving module 104 may monitor every incoming packet directed at a server (e.g., as part of a firewall) and/or analyze every incoming packet (e.g., as part of a server) to determine the type of the packet and/or the destination port of the packet. For example, receiving module 104 may monitor incoming TCP packets for a particular server and may identify the source computing device, source port, destination port, and/or packet type for each packet directed toward that particular server. In this example, receiving module 104 may determine whether a SYN flag is set on a packet in order to determine if the packet is a TCP initialization packet. In other examples, receiving module 104 may only monitor incoming initialization packets. Additionally or alternatively, receiving module 104 may monitor incoming packets for multiple servers and/or may also analyze each packet to determine the destination server to which the packet is directed.

At step 304, one or more of the systems described herein may thwart potential illegitimate initialization attempts by intentionally dropping the initialization packet. For example, thwarting module 106 may, as part of destination computing device 206 in FIG. 2, thwart potential illegitimate initialization attempts by intentionally dropping initialization packet 208.

The phrase "intentionally dropping," as used herein, generally refers to any method of receiving a packet configured to elicit a response without sending a response to the packet. For example, thwarting module 106 may intentionally drop an initialization packet by receiving the packet and refraining from sending a response to the packet. In another example, thwarting module 106 may intentionally drop a packet by blocking the packet from reaching a server that is expected to respond to the packet.

Thwarting module 106 may thwart potential illegitimate initialization attempts in a variety of ways and/or contexts. For example, thwarting module 106 may operate at the network layer and may drop packets directed to a port on a server before the packets reach the server. In another example, thwarting module 106 may be part of an application on a server that monitors incoming SYN packets and drops the first SYN packet sent to any port on the server from any port on a remote device.

In some examples, thwarting module 106 may also drop additional initialization packets (i.e., more than just the initial initialization packet) from the same source port on the same source computing device directed to the same destination port on the destination computing device. For example, thwarting module 106 may drop additional initialization packets from the same source port on the same source computing device directed to the same destination port on the destination computing device if the systems described herein have observed other packets sent by the same source computing device directed to other destination ports on the destination computing device, since this behavior may be indicative of a port scan.

Figure 4:
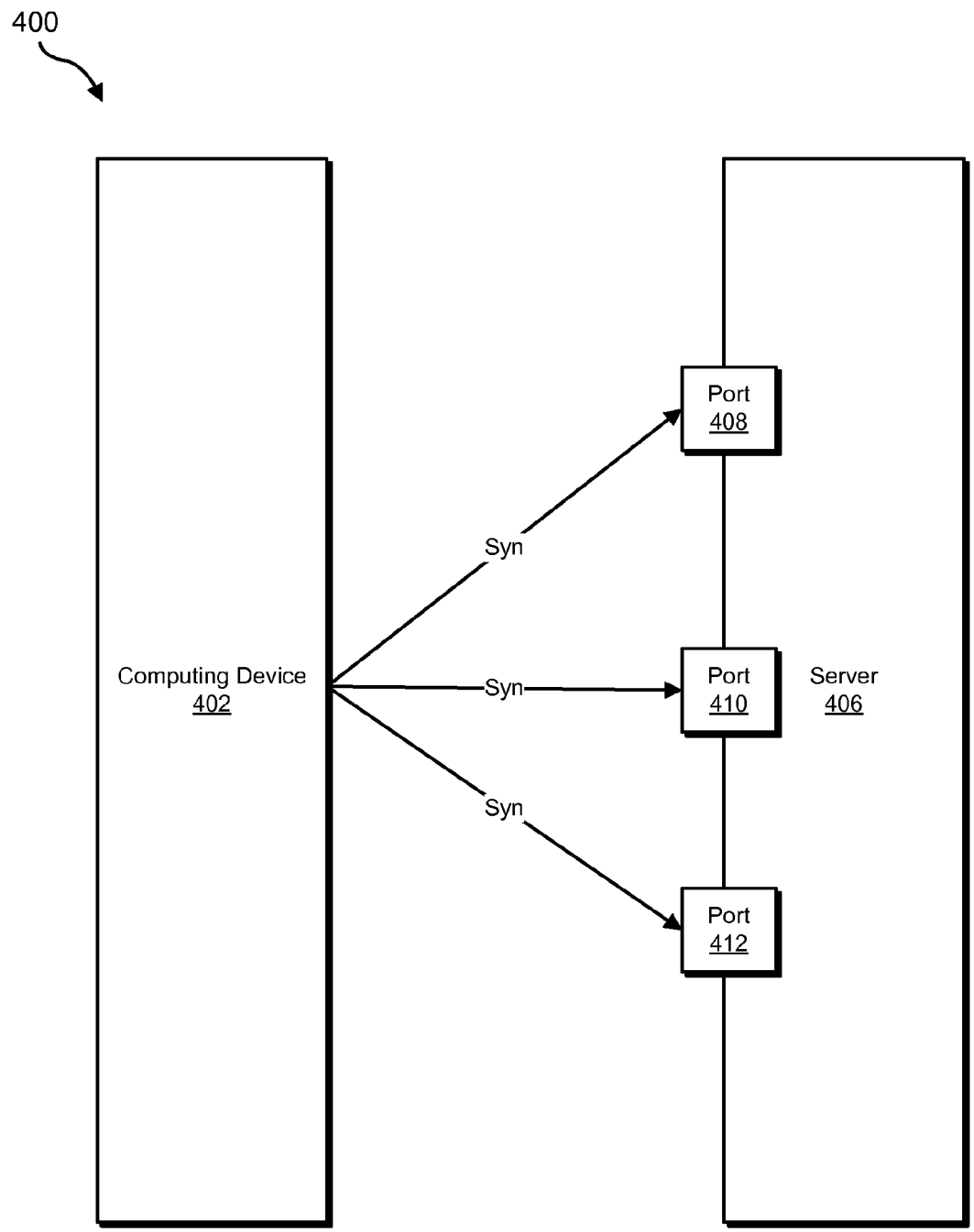
FIG. 4 is a block diagram of an exemplary illegitimate initialization attempt.

In some examples, thwarting module 106 may thwart an illegitimate initialization attempt that is part of a port scan. For example, and as illustrated in FIG. 4, a computing device 402 may send SYN packets to ports 408, 410, and/or 412 on a server 406. In this example, computing device 402 may be operated by a malicious user and may be both sending SYN packets to each port on server 406 and analyzing the responses to said SYN packets in order to determine if server 406 is running any services with known vulnerabilities that the malicious user can exploit. In this figure, thwarting module 106 may thwart this port scan by intentionally dropping (i.e., avoiding sending responses to) the SYN packets sent by the malicious user.

Returning to FIG. 3, at step 306, one or more of the systems described herein may receive an additional initialization packet. For example, receiving module 104 may, as part of destination computing device 206 in FIG. 2, receive additional initialization packet 214.

In some examples, source computing devices attempting to establish legitimate connections may send several initialization packets and/or may send initialization packets until a response is received. In these examples, receiving module 104 may, in step 304, receive an additional initialization packet shortly after receiving the original initialization packet in step 302. For example, a legitimate computing device may send a SYN packet and then send another SYN packet a second later after failing to receive a response to the first SYN packet. In contrast, an illegitimate initialization attempt may send one SYN packet each to a large number of ports and/or computing devices without sending follow-up SYN packets to any ports. Thus, if the systems described herein receive a second packet that matches the first packet, these systems may determine that both packets are part of a legitimate initialization attempt.

At step 308, one or more of the systems described herein may determine that the additional initialization packet is from the same source port on the same source computing device and is directed to the same destination port on the same destination computing device as the original initialization packet. For example, determination module 108 may, as part of destination computing device 206 in FIG. 2, determine that additional initialization packet 214 is from the same source port 210 on the same source computing device 202 and is directed to the same destination port 212 on the same destination computing device 206 as the original initialization packet 208.

Determination module 108 may make this determination in a variety of ways. For example, both packets may be SYN packets. In this example, determination module 108 may determine, by comparing the 4-tuple of source port, source address, destination port, and destination address that is included in these SYN packets, that the additional initialization packet is from the same source port on the same source computing device and is directed to the same destination port on the same destination computing device as the original initialization packet. For example, initialization packet 208 may include the 4-tuple source port 210, source computing device 202, destination port 212, and/or destination computing device 206. Additional initialization packet 214 may also include the 4-tuple source port 210, source computing device 202, destination port 212, and/or destination computing device 206. In this example, determination module 108 may determine that initialization packet 208 and initialization packet 214 include the same 4-tuple, suggesting that initialization packet 214 is part of a legitimate initialization attempt and therefore safe to respond to.

In some examples, determination module 108 may also determine that the additional initialization packet was received within a predetermined time period after receiving the original initialization packet. In some embodiments, computing devices attempting to establish legitimate connections may send at least one additional initialization packet after a short amount of time if no response is returned to the original initialization packet. As such, determination module 108 may determine that any packet received within three seconds, ten seconds, or one minute of the original initialization packet is part of the same connection attempt as the original initialization packet, whereas any initialization packet received after that time is part of a new attempt and should be dropped.

The systems described herein may store the information contained in an initialization packet (e.g., the 4-tuple of source port, source address, destination port, and destination address from each packet) in a variety of ways. In some embodiments, determination module 108 may store the set of 4-tuples of recently received packets in any suitable data structure, such as a hash, a hashtable, an array, a linked list, and/or a table.

At step 310, one or more of the systems described herein may send an acknowledgement packet that initiates communication between the source computing device and the destination computing device in response to determining that the additional initialization packet is from the same source port on the same source computing device and is directed to the same destination port on the same destination computing device as the original initialization packet. For example, sending module 110 may, as part of destination computing device 206 in FIG. 2, send an acknowledgement packet 216 that initiates communication between source computing device 202 and destination computing device 206 in response to determining that additional initialization packet 214 is from the same source port 210 on the same source computing device 202 and is directed to the same destination port 212 on the same destination computing device 206 as the original initialization packet 208.

The term "acknowledgement packet," as used herein, generally refers to any packet sent in response to a previous packet. In some embodiments, an acknowledgement packet may be sent to acknowledge an attempt to initiate a connection and/or as the next step in the process of initiating a connection. An example of an acknowledgement packet includes, without limitation, a TCP synchronize-acknowledgement (SYN-ACK) packet.

Sending module 110 may send the acknowledgement packet in a variety of ways and/or contexts. In some examples, sending module 110 may only send a SYN-ACK packet in response to determination module 108 determining that the received SYN packet includes the same 4-tuple as a previous SYN packet. Specifically, because legitimate systems often continue to send SYN packets with the same 4-tuple until a SYN-ACK packet is received, while malicious systems performing port scans often only send a single SYN packet, sending module 110 may only send a SYN-ACK packet in response to a determination that the additional SYN packet includes the same 4-tuple as a previous SYN packet.

Figure 5:
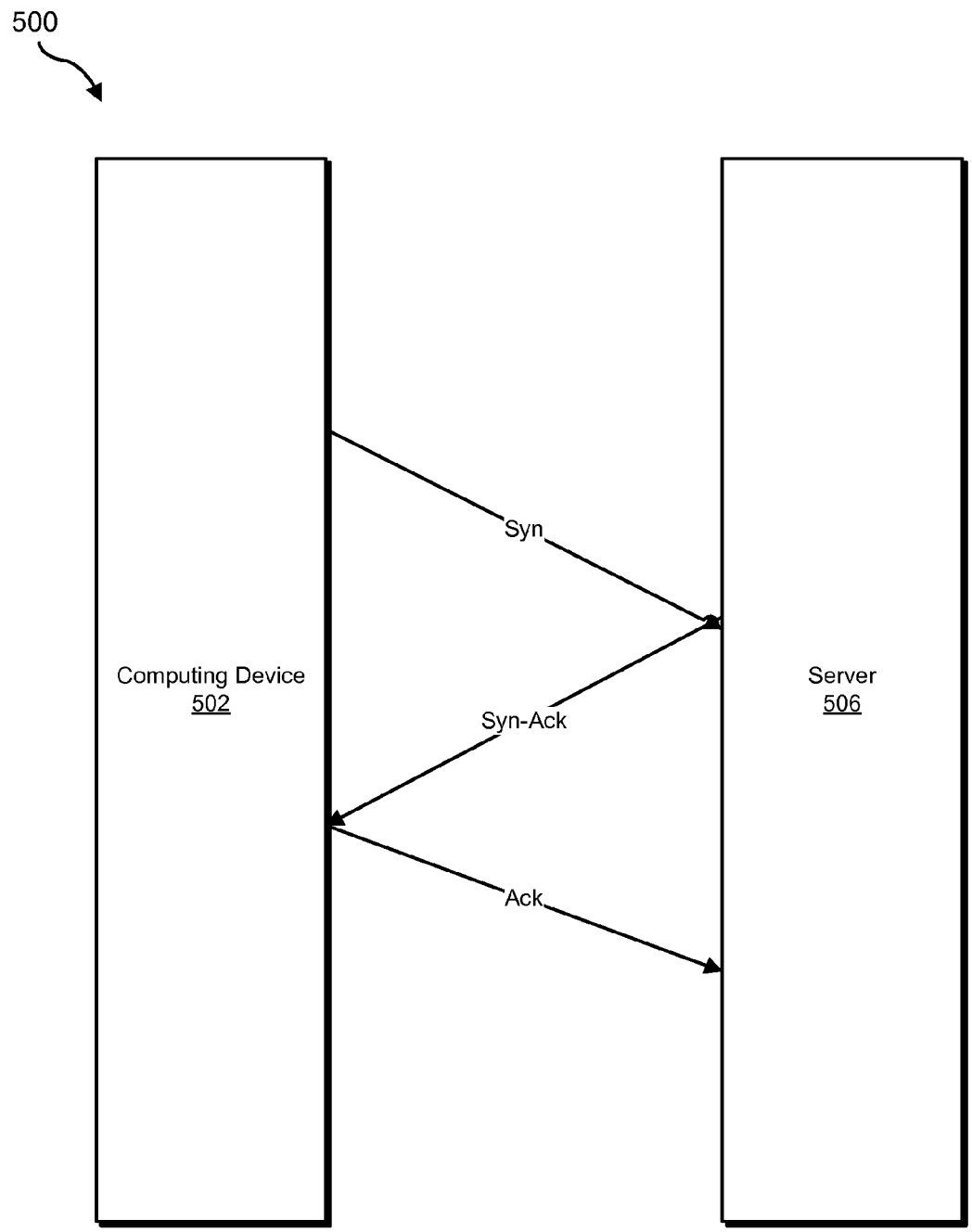
FIG. 5 is a block diagram of an exemplary legitimate initialization attempt.

In some examples, sending module 110 may send the acknowledgement packet as part of performing a TCP handshake. FIG. 5 is a block diagram of an exemplary legitimate initialization attempt that includes a TCP handshake. As illustrated in FIG. 5, a computing device 502 may send a SYN packet to a server 506. Server 506 may respond with a SYN-ACK packet in response to determining that the SYN packet includes the same 4-tuple as a previous SYN packet. Computing device 502 may then respond to the SYN-ACK packet with an acknowledgement (ACK) packet. After this, a TCP connection between computing device 502 and server 506 may be established and either computing device may send ACK packets to the other until the connection resets or is terminated.

Once the connection has been established, this connection may be ended in any number of ways. In some examples, after the connection has been ended, future SYN packets including the same 4-tuple will be subjected to the same scrutiny as any SYN packets with a new 4-tuple.

For example, receiving module 104 may receive a connection reset packet from the source port on the source computing device directed to the destination port on the destination computing device. In another example, receiving module 104 may receive a connection termination packet from the source port on the source computing device directed to the destination port on the destination computing device. Additionally or alternatively, a termination module may terminate communication between the source computing device and the destination computing device after a predetermined time period has passed without receiving any packets from the source computing device. In any or all of these cases, receiving module 104 may later receive a new initialization packet from the source port on the source computing device directed to the destination port on the destination computing device and thwarting module 104 may thwart potential illegitimate initialization attempts by intentionally dropping the new initialization packet.

Any combination of source port, source address, destination port, and/or destination address that does not match the original packet may be rejected. For example, receiving module 104 may receive a new initialization packet designed to initiate communication between an additional source port on the source computing device and the destination port on the destination computing device. In another example, receiving module 104 may receive a new initialization packet designed to initiate communication between the same source port on the source computing device and a new destination port on the destination computing device. Additionally or alternatively, receiving module 104 may receive a new initialization packet designed to initiate communication between the same source port on a different source computing device and the same destination port on the destination computing device. In any or all of these cases, thwarting module 106 may thwart potential illegitimate initialization attempts by intentionally dropping the new initialization packet.

As described in connection with method 300 above, the systems described herein may prevent port scans and related illegitimate initialization attempts without having to determine whether the first packet sent in any connection attempt is part of a legitimate or illegitimate attempt. For example, the systems described herein may block the first inbound SYN packet sent to any port. This may effectively thwart a port scan as no response will be returned to the SYN packets sent as part of the port scan. If the packet was part of a legitimate connection attempt, the remote device will often send another SYN packet after a short period of time, such as several seconds. If the second SYN packet matches the first in terms of source address, source port, destination address, and destination port, the systems described herein may respond with a SYN-ACK packet. If the connection is reset or terminated for any reason, the systems described herein may return to the initial state and drop all inbound SYN packets. By dropping the initial SYN packet but responding to subsequent packets, the systems described herein may thwart port scans while maintaining functionality for legitimate connection attempts. In addition, because the disclosed systems do not have to determine whether any given packet is legitimate or not, these systems may thwart illegitimate initialization attempts without consuming a significant amount of computing resources.

Figure 6:
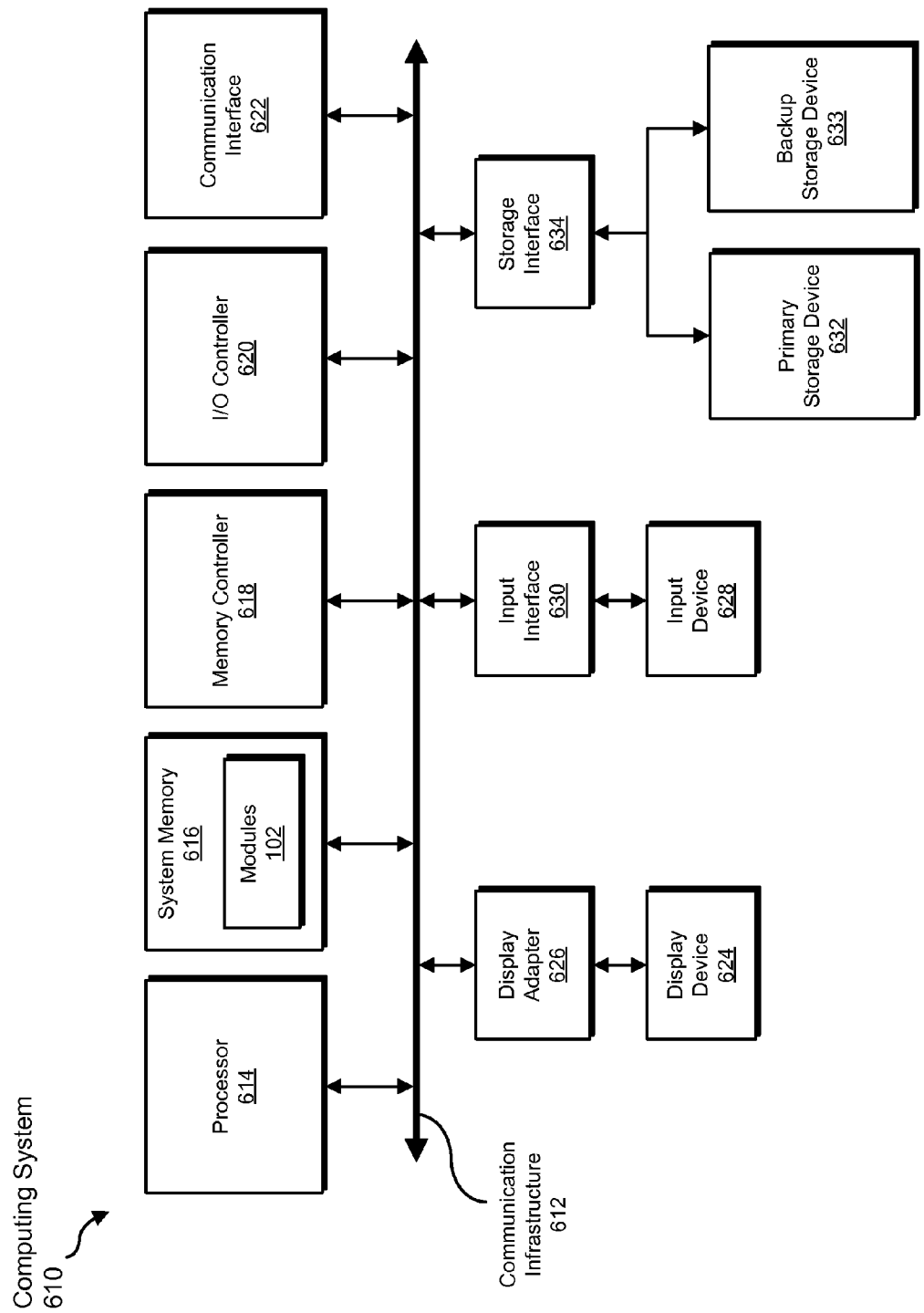
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
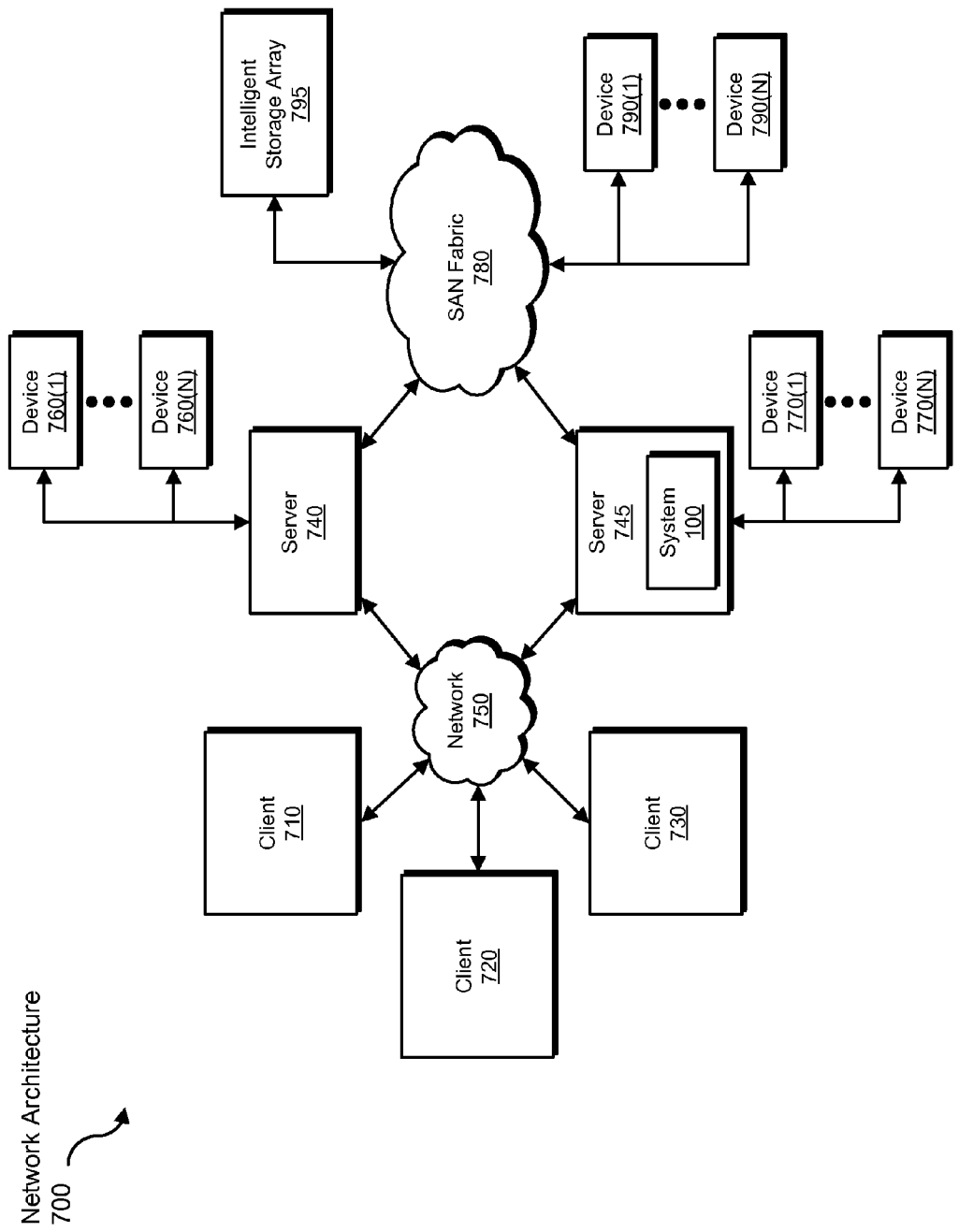
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for thwarting illegitimate initialization attempts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive packet data to be transformed, transform the packet data, output a result of the transformation to a data structure, use the result of the transformation to compare two or more packets, and store the result of the transformation to a server and/or security application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for thwarting illegitimate initialization attempts, at least a portion of the method being performed by a computing device comprising at least one processor, the method comprising:

receiving an initialization packet designed to initiate communication between a source port on a source computing device and a destination port on a destination computing device;

creating a record that comprises the source port on the source computing device and the destination port on the destination computing device;

thwarting potential illegitimate initialization attempts by intentionally dropping the initialization packet;

receiving an additional initialization packet;
determining that the additional initialization packet is from the same source port on the same source computing device and is directed to the same destination port on the same destination computing device as the original initialization packet by comparing the additional initialization packet with the record;
sending an acknowledgement packet that initiates communication between the source computing device and the destination computing device in response to determining that the additional initialization packet is from the same source port on the same source computing device and is directed to the same destination port on the same destination computing device as the original initialization packet.

2. The computer-implemented method of claim 1, wherein determining that the additional initialization packet is from the same source port on the same source computing device and is directed to the same destination port on the same destination computing device comprises determining that the additional initialization packet was received within a predetermined time period after receiving the original initialization packet.

3. The computer-implemented method of claim 1, further comprising:
receiving a connection reset packet from the source port on the source computing device directed to the destination port on the destination computing device;
receiving a new initialization packet from the source port on the source computing device directed to the destination port on the destination computing device;
thwarting potential illegitimate initialization attempts by intentionally dropping the new initialization packet.

4. The computer-implemented method of claim 1, further comprising:
receiving a connection termination packet from the source port on the source computing device directed to the destination port on the destination computing device;
receiving a new initialization packet from the source port on the source computing device directed to the destination port on the destination computing device;
thwarting potential illegitimate initialization attempts by intentionally dropping the new initialization packet.

5. The computer-implemented method of claim 1, further comprising:
terminating communication between the source computing device and the destination computing device after a predetermined time period has passed without receiving any packets from the source computing device;
receiving a new initialization packet from the source port on the source computing device directed to the destination port on the destination computing device;
thwarting potential illegitimate initialization attempts by intentionally dropping the new initialization packet.

6. The computer-implemented method of claim 1, further comprising:
receiving a new initialization packet designed to initiate communication between an additional source port on the source computing device and the destination port on the destination computing device;
thwarting potential illegitimate initialization attempts by intentionally dropping the new initialization packet.

7. The computer-implemented method of claim 1, wherein the initialization packet comprises a transmission control protocol synchronize packet.

8. A system for thwarting illegitimate initialization attempts, the system comprising:
a receiving module, stored in memory, that:
receives an initialization packet designed to initiate communication between a source port on a source computing device and a destination port on a destination computing device;
creates a record that comprises the source port on the source computing device and the destination port on the destination computing device;
receives an additional initialization packet;
a thwarting module, stored in memory, that thwarts potential illegitimate initialization attempts by intentionally dropping the initialization packet;
a determination module, stored in memory, that determines that the additional initialization packet is from the same source port on the same source computing device and is directed to the same destination port on the same destination computing device as the original initialization packet by comparing the additional initialization packet with the record;
a sending module, stored in memory, that sends an acknowledgement packet that initiates communication between the source computing device and the destination computing device in response to determining that the additional initialization packet is from the same source port on the same source computing device and is directed to the same destination port on the same destination computing device as the original initialization packet;
at least one physical processor configured to execute the receiving module, the thwarting module, the determination module, and the sending module.

9. The system of claim 8, wherein the determination module determines that the additional initialization packet is from the same source port on the same source computing device and is directed to the same destination port on the same destination computing device by determining that the additional initialization packet was received within a predetermined time period after receiving the original initialization packet.

10. The system of claim 8, wherein:
the receiving module receives a connection reset packet from the source port on the source computing device directed to the destination port on the destination computing device;
the receiving module receives a new initialization packet from the source port on the source computing device directed to the destination port on the destination computing device;
the thwarting module thwarts potential illegitimate initialization attempts by intentionally dropping the new initialization packet.

11. The system of claim 8, wherein:
the receiving module receives a connection termination packet from the source port on the source computing device directed to the destination port on the destination computing device;
the receiving module receives a new initialization packet from the source port on the source computing device directed to the destination port on the destination computing device;
the thwarting module thwarts potential illegitimate initialization attempts by intentionally dropping the new initialization packet.

12. The system of claim 8, further comprising a termination module, stored in memory, that terminates communication between the source computing device and the destination computing device after a predetermined time period has passed without receiving any packets from the source computing device;
   wherein the receiving module receives a new initialization packet from the source port on the source computing device directed to the destination port on the destination computing device;
   wherein the thwarting module thwarts potential illegitimate initialization attempts by intentionally dropping the new initialization packet.

13. The system of claim 8, wherein:
   the receiving module receives a new initialization packet designed to initiate communication between an additional source port on the source computing device and the destination port on the destination computing device;
   the thwarting module thwarts potential illegitimate initialization attempts by intentionally dropping the new initialization packet.

14. The system of claim 8, wherein the initialization packet comprises a transmission control protocol synchronize packet.

15. A non-transitory computer-readable medium comprising one or more computer-readable instructions that, when executed by at least one processor of a computing device, cause the computing device to:
   receive an initialization packet designed to initiate communication between a source port on a source computing device and a destination port on a destination computing device;
   create a record that comprises the source port on the source computing device and the destination port on the destination computing device;
   thwart potential illegitimate initialization attempts by intentionally dropping the initialization packet;
   receive an additional initialization packet;
   determine that the additional initialization packet is from the same source port on the same source computing device and is directed to the same destination port on the same destination computing device as the original initialization packet by comparing the additional initialization packet with the record;
   send an acknowledgement packet that initiates communication between the source computing device and the destination computing device in response to determining that the additional initialization packet is from the same source port on the same source computing device and is directed to the same destination port on the same destination computing device as the original initialization packet.

16. The non-transitory computer-readable medium of claim 15, wherein the one or more computer-readable instructions cause the computing device to determine that the additional initialization packet is from the same source port on the same source computing device and is directed to the same destination port on the same destination computing device by determining that the additional initialization packet was received within a predetermined time period after receiving the original initialization packet.

17. The non-transitory computer-readable medium of claim 15, wherein the one or more computer-readable instructions cause the computing device to:
   receive a connection reset packet from the source port on the source computing device directed to the destination port on the destination computing device;
   receive a new initialization packet from the source port on the source computing device directed to the destination port on the destination computing device;
   thwart potential illegitimate initialization attempts by intentionally dropping the new initialization packet.

18. The non-transitory computer-readable medium of claim 15, wherein the one or more computer-readable instructions cause the computing device to:
   receive a connection termination packet from the source port on the source computing device directed to the destination port on the destination computing device;
   receive a new initialization packet from the source port on the source computing device directed to the destination port on the destination computing device;
   thwart potential illegitimate initialization attempts by intentionally dropping the new initialization packet.

19. The non-transitory computer-readable medium of claim 15, wherein the one or more computer-readable instructions cause the computing device to:
   terminate communication between the source computing device and the destination computing device after a predetermined time period has passed without receiving any packets from the source computing device;
   receive a new initialization packet from the source port on the source computing device directed to the destination port on the destination computing device;
   thwart potential illegitimate initialization attempts by intentionally dropping the new initialization packet.

20. The non-transitory computer-readable medium of claim 15, wherein the one or more computer-readable instructions cause the computing device to:
   receive a new initialization packet designed to initiate communication between an additional source port on the source computing device and the destination port on the destination computing device;
   thwart potential illegitimate initialization attempts by intentionally dropping the new initialization packet.

* * * * *